United States Patent
Biensan et al.

[11] 3,888,832
[45] June 10, 1975

[54] PROCESS FOR OBTAINING POLYAMIDES

[75] Inventors: Michael Biensan; Philippe Potin, both of Billiere, France

[73] Assignee: Societe Aquitaine-Total Organico, Courbevoie, France

[22] Filed: Aug. 16, 1972

[21] Appl. No.: 281,152

[30] Foreign Application Priority Data
Aug. 25, 1971 France .............................. 71.30755

[52] U.S. Cl. ............................ 260/78 L; 260/45.95
[51] Int. Cl. ............................................ C08g 20/18
[58] Field of Search ............. 260/45.95, 78 L, 78 P, 260/78 S

[56] References Cited
UNITED STATES PATENTS
2,857,364 10/1958 Berthold et al. .................. 260/78 L
3,639,659 2/1972 Nieswanot et al. ................ 260/78 L

*Primary Examiner*—Lucille M. Phynes

[57] ABSTRACT

This invention concerns a process for obtaining polyamides in which the polymer is mixed with one or more tertiary alcohols with the formula:

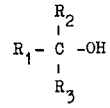

where $R_1$, $R_2$ and $R_3$ are hydrocarbon radicals, preferably aliphatic radicals.

In this process, the polyamide is obtained by anionic polymerization of lactams in an anhydrous medium, in the presence of alkaline catalysts, usually sodium catalysts, and possible activators.

7 Claims, No Drawings

PROCESS FOR OBTAINING POLYAMIDES

This invention concerns an improved process for obtaining polyamides. More specifically, it concerns an improved process for obtaining polyamides from lactam with at least 4 carbon atoms in the cycle, particularly caprolactam and/or dodecalactam.

It also concerns polyamides obtained in this way, and films, bands, fibres and moulded objects made from them.

ε-caprolactam can be used to obtain substances with a high molecular weight, when the lactam is heated in an anhydrous medium in the presence of substances setting an alkaline ion free, such as sodium, sodium hydride, sodium and potassium alcoholate, and particularly in the presence of a sodium salt of the lactam used. Polymerization can take place at temperatures between 220° and 250°C, or at lower temperatures, between 150° and 180°C, if an activator is added.

The 6-polyamides obtained are rather unsatisfactory, since their viscosity is unstable. During the subsequent treatments at usually fairly high temperatures, to which such polyamides are subjected in the making of fibres, films, sheets, moulded objects, etc, the molecular weight is found to decrease rapidly, and it is almost impossible to obtain uniform viscosity in the molten state within a reasonable period of time. This drawback arises from the fact that the polymerization is an equilibrium reaction, with the equilibrium adjusting to produce the lactam product when the temperature rises. At 230°C, for instance, approximately 10 % monomer lactam is found in the molten polymer.

This equilibrium reaction makes it impossible to remove the caprolactam in the anionic 6-nylon by degassing, since the equilibrium is immediately reestablished by depolymerization, as the monomer is extracted.

To prevent the decomposition of the polymer that occurs in existing processes, it has to be washed with acidified aqueous solutions, to eliminate the sodium. This has to be followed by washing with water and drying, which considerably increases the cost of the polyamide.

In the case of dodecalactam, it is also possible to obtain polyamides with high molecular weight, when the lactam is heated in an anhydrous medium, in the presence of substances setting an alkaline ion free, such as sodium hydride or alcoholate, or the sodium salt of the lactam used. Polymerization can take place at temperatures between 230° and 270°C, or at lower temperatures if an activator is added.

No depolymerization occurs in the 12-polyamides obtained by this process, but there is a completely chaotic development of the melting viscosity of the polymer and its viscosity in solution, resulting from a simultaneous process of chain breakage and disorderly branchings.

This invention concerns an improved process for obtaining polyamides with high molecular weight, in which these drawbacks can be overcome. The process is of particular interest because it can be applied to the anionic polymerization in an anhydrous medium and in the presence of alkaline catalysts of all lactams, producing polyamides with completely stable viscosity in the molten state. The process can be used in particular to obtain polymers and copolymers from caprolactam, capryllactam and/or dodecalactam, for instance.

The invention concerns a process for obtaining polyamides in which anionic polymerization of lactams occurs in an anhydrous medium, in the presence of alkaline catalysts, usually sodium catalysts, and possibly activators, characterized by the fact that one or more tertiary alcohols are added to the polymer, with the formula:

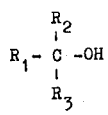

where $R_1$, $R_2$, and $R_3$ are preferably aliphatic radicals.

In one embodiment of the invention, the tertiary alcohol used is tertiary butyl alcohol.

According to another feature of the invention, these substances are added to the polyamide in ratios of between 0.05 and 2 moles, and preferably 0.2 to 1 mole, per 100 moles of the initial lactam; the proportions depend on the quantity of sodium present at the beginning.

In one embodiment of the invention, the substances are added at the end of polymerization, by being mixed with the molten polymer in the polymerization reactor.

In another embodiment of the invention, the substances are added to the polymer by being made into a paste, followed by mixing or extrusion.

The invention also concerns fibres, films, sheets, moulded objects and other products made from polyamides produced by this process.

Other purposes and advantages of the invention will be shown by the following examples representing some embodiments of the invention, which, however, is in no way confined to these examples.

The flow index of the polyamides is measured, namely the weight of product flowing through a 1.35 mm nozzle at a temperature of 240°C, when a pressure of 2 kg/sq.cm is applied.

EXAMPLES 1 AND 2

Anionic polymerization of dodecalactam was performed in a Grignard reactor at 240°C, using a catalyst containing 1 % moles of sodium. When polymerization was completed, the product was extruded through a nozzle at the base of the reactor.

For the stabilizing agent test, the agent was added to the molten polymer, and homogenized for 30 minutes. Samples were then taken after 1, 2, 3 and 4 hours.

Example 1 was a control test done for comparison purposes, in which the polymer was extruded without any of the substances proposed in this invention being added.

In example 2, the stabilizing agent was 2 % moles of tertiary-butyl alcohol.

Table 1

| Time in hours | 0 | 1 | 2 | 3 | 4 |
| --- | --- | --- | --- | --- | --- |
| Example 1 (control) Flow index (g/mn) | 75 | 35 | 21 | 13 | 0 |
| Example 2 (with tertio-butylic alcohol) Flow index (g/mn) | 165 | 164 | 134 | 125 | 120 |

Naturally, the invention is in no way confined to these embodiments: many alternative forms are possible, for someone skilled in the art, without any departure from the spirit of the invention.

The substances which according to the present invention are mixed with the polymer are under the circumstances, more acid than the amide functions of the polymers and lactams and produce only limited or no acidolysis of the polymer chain.

What is claimed is:

1. In a process for preparing stabilized polyamides of high molecular weight by anionic polymerization of lactams, the improvement comprises polymerizing said lactam in an anhydrous medium with an alkali catalyst and adding to the resulting polymer at least one tertiary alcohol of the formula

wherein $R_1$, $R_2$, and $R_3$ are paraffin radicals, the amount of the added tertiary alcohol being from about 0.05 to about 2.00 moles per 100 moles of the starting lactam.

2. A process according to claim 1 wherein said alkali catalyst is sodium.

3. A process as defined in claim 1, in which the tertiary alcohol is tertiary butyl alcohol.

4. A process as defined in claim 1, in which the lactam is at least one member belonging to the group comprising caprolactam, dodecalactam and capryllactam.

5. A process as defined in claim 1, in which between 0.2 and 1 mole of the alcohol per 100 moles of lactam are added.

6. A process as defined in claim 1, in which the alcohol is added after the polymerization, by being mixed with the molten polymer in the polymerization reactor.

7. A process as defined in claim 1, in which the alcohol is added to the polymer in the form of a paste, followed by mixing or extrusion.

* * * * *